United States Patent
Zhang et al.

(10) Patent No.: US 11,716,162 B2
(45) Date of Patent: Aug. 1, 2023

(54) METHOD AND SYSTEM FOR CONTROLLING NETWORK TIMING PRECISION OF A SEISMIC COLLECTOR, AND TERMINAL DEVICE

(71) Applicant: INSTITUTE OF GEOLOGY AND GEOPHYSICS, THE CHINESE ACADEMY OF SCIENCES, Beijing (CN)

(72) Inventors: Shengquan Zhang, Beijing (CN); Tianyao Hao, Beijing (CN); Qing Xu, Beijing (CN); Yan Zhang, Beijing (CN); Juan Wang, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 118 days.

(21) Appl. No.: 17/475,369

(22) Filed: Sep. 15, 2021

(65) Prior Publication Data
US 2022/0006548 A1    Jan. 6, 2022

Related U.S. Application Data

(63) Continuation of application No. PCT/CN2021/077592, filed on Feb. 24, 2021.

(30) Foreign Application Priority Data

Mar. 31, 2020   (CN) .......................... 202010244198.3

(51) Int. Cl.
| | | |
|---|---|---|
| *H04J 3/06* | (2006.01) | |
| *H04L 7/00* | (2006.01) | |
| *H04W 56/00* | (2009.01) | |

(52) U.S. Cl.
CPC .......... *H04J 3/0682* (2013.01); *H04J 3/0667* (2013.01); *H04L 7/0016* (2013.01); *H04W 56/004* (2013.01)

(58) Field of Classification Search
CPC ..... H04J 3/0667; H04J 3/0682; H04L 7/0016; H04W 56/004
See application file for complete search history.

(56) References Cited

U.S. PATENT DOCUMENTS

| | | | |
|---|---|---|---|
| 6,985,499 B2 * | 1/2006 | Elliot .................... | H04J 3/0697 370/506 |
| 7,535,931 B1 | 5/2009 | Zampetti et al. | |

(Continued)

FOREIGN PATENT DOCUMENTS

| | | |
|---|---|---|
| CN | 102647269 A | 8/2012 |
| CN | 109167667 A | 1/2019 |

OTHER PUBLICATIONS

First Office Action from China Patent Office in a counterpart Chinese Patent Application 202010244198.3, dated Oct. 30, 2020.

(Continued)

*Primary Examiner* — Alpus Hsu (57) ABSTRACT

There is disclosed a method and system for controlling network timing precision of a seismic collector, and a terminal device. The method includes: using an interrupt mode to transmit a data packet; calculating an optimal network delay; and correcting a transmission error in a network timing process according to the optimal network delay, after which the physical layer of a server receives the data packet and sends the data from the physical layer of the server to the application layer of the server using the interrupt mode thereby timing the data packet.

20 Claims, 2 Drawing Sheets

(56) References Cited

U.S. PATENT DOCUMENTS

| | | | |
|---|---|---|---|
| 7,876,788 B2* | 1/2011 | Elliot | H04J 3/0697 |
| | | | 370/503 |
| 8,849,937 B2* | 9/2014 | Park | H04J 3/0667 |
| | | | 709/248 |
| 9,742,514 B2* | 8/2017 | Zhao | H04J 3/0697 |
| 2009/0284373 A1 | 11/2009 | Komiya et al. | |
| 2014/0064303 A1 | 3/2014 | Aweya et al. | |
| 2016/0094298 A1* | 3/2016 | Isfeldt | H04B 13/02 |
| | | | 398/104 |
| 2017/0203815 A1* | 7/2017 | Dudley | B63B 21/62 |
| 2018/0076949 A1* | 3/2018 | Mayer | H04B 10/40 |
| 2018/0191802 A1* | 7/2018 | Yang | H04L 1/0018 |
| 2018/0346076 A1* | 12/2018 | Dudley | G01V 1/3843 |
| 2019/0386763 A1* | 12/2019 | Rentschler | H04L 12/28 |
| 2021/0204230 A1* | 7/2021 | Van Phan | H04J 3/0667 |

OTHER PUBLICATIONS

Opinion of the International Searching Authority for No. PCT/CN2021/077592.

* cited by examiner

METHOD AND SYSTEM FOR CONTROLLING NETWORK TIMING PRECISION OF A SEISMIC COLLECTOR, AND TERMINAL DEVICE

CROSS-REFERENCE TO RELATED APPLICATIONS

This application is a continuation of co-pending International Patent Application Number PCT/CN2021/077592, filed on Feb. 24, 2021, which claims the benefit and priority of Chinese Patent Application Number 202010244198.3, filed on Mar. 31, 2020, with China National Intellectual Property Administration, the disclosures of which are incorporated herein by reference in their entireties.

TECHNICAL FIELD

This disclosure relates to the field of seismic data acquisition, and more particularly relates to a method and system for controlling network timing precision of a seismic collector, a terminal device, and a computer-readable storage medium.

BACKGROUND

In the field of geophysics, especially in the field of seismic data acquisition, the time information of the seismic data collected by a seismic collector is one piece of the very important information of a seismic signal. For the seismic data collector specifically, its own time service is also one of its important indicators. Currently, the time service sources of all seismic data collectors mainly come from two aspects. One is GPS-based time service, which specifically includes receiving fixed-format message information from a communication interface such as a serial port, Inter-Integrated Circuit (I2C), or Serial Peripheral Interface (SPI). The information contains the specific year, month, day, hour, minute, and second information, which may be used in conjunction with pulse per second (PPS) to achieve precise time service. The other is the network-based time service mechanism, which is divided into two types. One is network time protocol (NTP) based on the general network. Its timing mechanism works at the network application layer and can realize time synchronization under general network hardware, but has disadvantages of low timing precision, which lies in the millisecond (ms) level. The other network-based time synchronization protocol is the Precision Time Protocol (PTP) network time protocol, which operates under a specific network link and requires special hardware to achieve network time service. The advantages include high time service precision, which can be precise to the microsecond (µs) level. The disadvantages are high implementation costs (including necessary hardware costs and software operating costs) and the requirement of support of special network hardware, which makes it not favorable to implementation under general network hardware conditions.

In the field of seismic data acquisition, conventional seismic data acquisition requires a sampling rate of less than 500 when processing geophysical natural seismic signals, and for active source seismic acquisition, the data sampling rate is also required to be less than 10K. Therefore, in view of its special application field, the clock accuracy of its seismic data collector needs to be controlled between microseconds to one tenth of a millisecond. Furthermore, for real-time data transmission to the seismic collector, because it needs to transmit the collected data to a fixed server or station network through the network, it must be equipped with a normal network communication module according to the standard, which can realize the software embedding on the network application layer. At the same time, because part of the seismic data collector needs to be deployed in special environments such as mines and buildings, it would be impossible to receive GPS signals in these environments.

SUMMARY

In view of this, embodiments of the present disclosure provide a method and system for controlling network timing precision of a seismic collector, and terminal device, where the method can be applied to a data collector equipped with network transmission hardware, and can realize time service through software algorithms without changing the hardware where the time service precision can be greatly improved. In order to achieve maximum compatibility, the algorithm can run on the NTPV0 version.

According to a first aspect, embodiments of the present disclosure provide a method for controlling network timing precision of a seismic collector, which includes the following operations:

upon receiving a data packet, using, by a client, an interrupt mode to make the data packet be received by an application layer of the client, and using the interrupt mode to send the data packet from the application layer of the client to a physical layer of the client;

presetting, by the client, a network environment constraint value when sending the data packet to a server;

continually detecting GAP value and DELAY value at different times during a secondary time synchronization process with the network environment constraint value, where the GAP value is the clock offset between the client and the server, and the DELAY value represents the time delay of the data packet in the round-trip process between the client and the server;

performing constrained convergence judgment on the GAP value and DELAY value, and calculating the optimal network delay;

after correcting the transmission error in the network timing process according to the optimal network delay, receiving, by the physical layer of the server, the data packet; and sending the data from the physical layer of the server to the application layer of the server using the interrupt mode for timing the data packet.

Optionally, the operation of upon receiving a data packet, using, by the client, the interrupt mode to make the data packet be received by the application layer of the client, and using the interrupt mode to send the data packet from the application layer of the client to the physical layer of the client may include:

presetting the data packet sending mode of the client's application layer and the data packet receiving mode of the client's physical layer to interrupt mode, setting the priority of the client's physical layer to the highest, and setting the priority of the application layer interruption to be equal to the priority of the client's physical layer minus 1;

at time point T1, packing, by the client, the NTP data packet, and filling the sending time field with the client's own time CT1 obtained at the time of packing plus 1 ms, and sending the data packet through the application layer when an interrupt occurs; and upon detecting the arrival of the data packet, interrupting the reception by the physical layer, and storing the client's own time acquired at the moment, and further flagging a bit of the data packet and waiting for processing.

Optionally, the operation of performing constrained convergence judgment on the GAP value and DELAY value, and calculating the optimal network delay may include:

selecting the minimum value of DELAY in the network environment constraint values as DELAY0 in the first cycle, and storing the DELAY0 and its corresponding GAP0 in the sample library;

continuing to count and measure the GAP value and DELAY value in the secondary time synchronization process with the network environment constraint values, and selecting the minimum value of the statistical network environment constraint values as DELAY1 and GAP1;

if DELAY1 is less than DELAY0, and GAP1 lies within the range of GAP0±(DELAY1−DELAY0)/convergence coefficient, then updating the DELAY1 and GAP1 to the new GAP0 and DELAY0, marking this value as available and the sample as a valid sample;

if the number of valid samples is greater than the maximum number of samples in the fitting library, performing Kalman filtering on the GAP and DELAY values in the valid samples to obtain the DELAYD and GAPD values of the optimal solution; and using the DELAYD value and GAPD value of the obtained optimal solution as the optimal network delay.

Optionally, the method further includes:

if DELAY1 is not less than DELAY0, or GAP1 does not lie within the range of GAP0±(DELAY1−DELAY0)/convergence coefficient, then discarding the DELAY value and GAP value counted in this time.

Optionally, the maximum number of samples in the fitting library is 64.

According to a second aspect, embodiments of the present disclosure provide a system for controlling network timing precision of a seismic collector, which includes:

a data processing module configured for using an interrupt mode to make the data packet be received by an application layer of the client upon receiving a data packet by the client, and using the interrupt mode to send the data packet from the application layer of the client to a physical layer of the client;

an optimal network delay calculation module configured for: continually detecting GAP value and DELAY value at different times during a secondary time synchronization process with the network environment constraint value, where the GAP value is the clock offset between the client and the server, and the DELAY value represents the time delay of the data packet in the round-trip process between the client and the server; performing constrained convergence judgment on the GAP value and DELAY value, and calculating the optimal network delay;

a correction and timing module configured for correcting the transmission error in the network timing process according to the optimal network delay, so that the physical layer of the server receives the data packet, and the data is sent from the physical layer of the server to the application layer of the server using the interrupt mode for timing the data packet.

Optionally, the data processing module is configured for:

presetting the data packet sending mode of the client's application layer and the data packet receiving mode of the client's physical layer to interrupt mode, setting the priority of the client's physical layer to the highest, and setting the priority of the application layer interruption to be equal to the priority of the client's physical layer minus 1;

at time point T1, packing, by the client, the NTP data packet, and filling the sending time field with the client's own time CT1 obtained at the time of packing plus 1 ms, and sending the data packet through the application layer when an interrupt occurs; and upon detecting the arrival of the data packet, interrupting the reception by the physical layer, and storing the client's own time acquired at the moment, and further flagging a bit of the data packet and waiting for processing.

Optionally, the optimal network delay calculation module performing constrained convergence judgment on the GAP value and DELAY value, and calculating the optimal network delay is used for:

selecting the minimum value of DELAY in the network environment constraint values as DELAY0 in the first cycle, and storing the DELAY0 and its corresponding GAP0 in the sample library;

continuing to count and measure the GAP value and DELAY value in the secondary time synchronization process with the network environment constraint values, and selecting the minimum value of the statistical network environment constraint values as DELAY1 and GAP1;

if DELAY1 is less than DELAY0, and GAP1 lies within the range of GAP0±(DELAY1−DELAY0)/convergence coefficient, then updating the DELAY1 and GAP1 to the new GAP0 and DELAY0, marking this value as available and the sample as a valid sample;

if the number of valid samples is greater than the maximum number of samples in the fitting library, performing Kalman filtering on the GAP and DELAY values in the valid samples to obtain the DELAYD and GAPD values of the optimal solution; and using the DELAYD value and GAPD value of the obtained optimal solution as the optimal network delay.

According to third aspect, embodiments of the present disclosure provide a terminal device, including a memory, a processor, and a computer program stored in the memory and capable of running on the processor, where the computer program when executed by the processor causes the method described in first aspect to be performed.

According to fourth aspect, embodiments of the present disclosure provide a computer-readable storage medium having a computer program stored therein, which when executed by a processor causes the method mentioned in the first aspect to be performed.

Compared with the prior art, embodiments of the present disclosure have the following beneficial effects. In particular, the present application adopts the interrupt mode to enable the data packet to be transferred between the physical layer and the application layer of the client and between the physical layer and the application layer of the server, thereby realizing the accurate stamping of the data packet timestamp. Furthermore, because this algorithm adopts the symmetric algorithm mode in both the client and the server, the execution error produced by it can be greatly reduced due to the symmetry. The error caused by the data packet transmission between the client and the server can be adjusted by calculating the optimal network delay, which greatly reduces the timing error and improves the network timing precision.

DETAILED DESCRIPTION

For a better understanding of the objectives, technical solutions, and advantages of the present application, hereinafter the present application will be described in further detail in connection with the accompanying drawings and some illustrative embodiments. It is to be understood that the specific embodiments described here are intended for the mere purposes of illustrating this application, instead of limiting.

Embodiment 1

Figure 1:
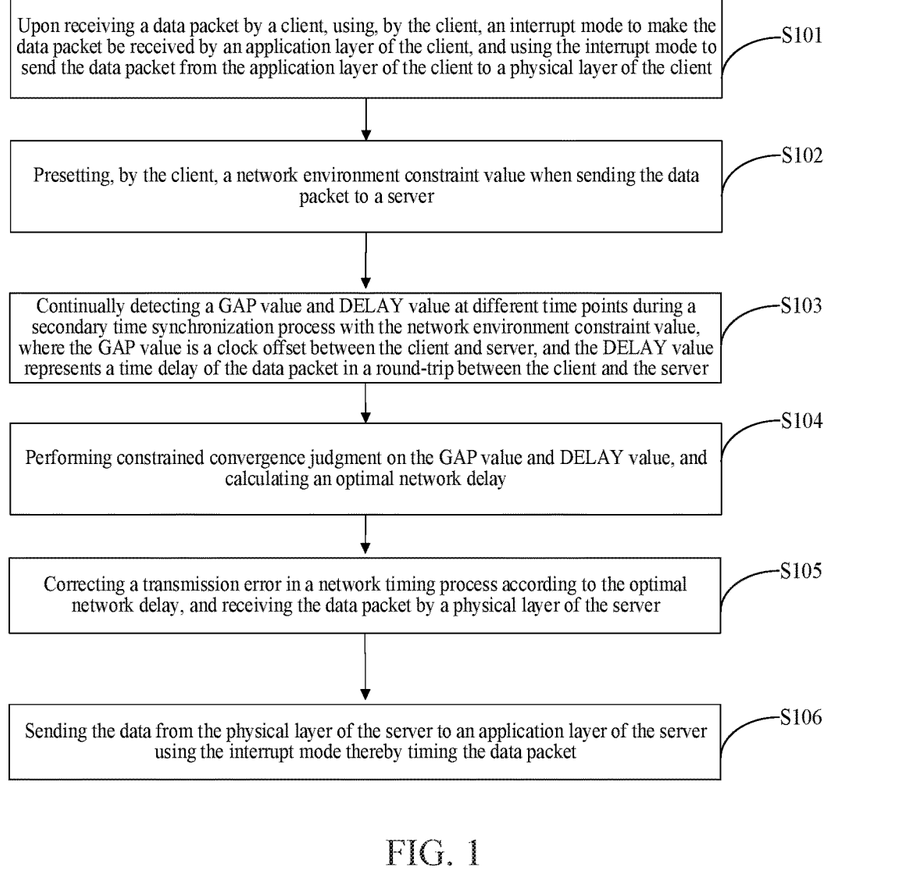
FIG. 1 is a schematic flowchart illustrating a method for controlling network timing precision of a seismic collector according to an embodiment of the present disclosure.

FIG. 1 is a schematic flowchart illustrating a method for controlling network timing precision of a seismic collector according to an embodiment of the present disclosure. The method may include the following operations.

In S101, the method may include upon receiving a data packet, using, by a client, an interrupt mode to make the data packet be received by an application layer of the client, and using the interrupt mode to send the data packet from the application layer of the client to a physical layer of the client.

In S102, the method may include presetting, by the client, a network environment constraint value when sending the data packet to a server.

In S103, the method may include continually detecting GAP value and DELAY value at different times during a secondary time synchronization process with the network environment constraint value, where the GAP value is the clock offset between the client and the server, and the DELAY value represents the time delay of the data packet in the round-trip process between the client and the server.

In S104, the method may include performing constrained convergence judgment on the GAP value and DELAY value, and calculating the optimal network delay.

In S105, the method may include after correcting the transmission error in the network timing process according to the optimal network delay, receiving, by the physical layer of the server, the data packet.

In S106, the method may include sending the data from the physical layer of the server to the application layer of the server using the interrupt mode for timing the data packet.

Embodiment 2

Figure 2:
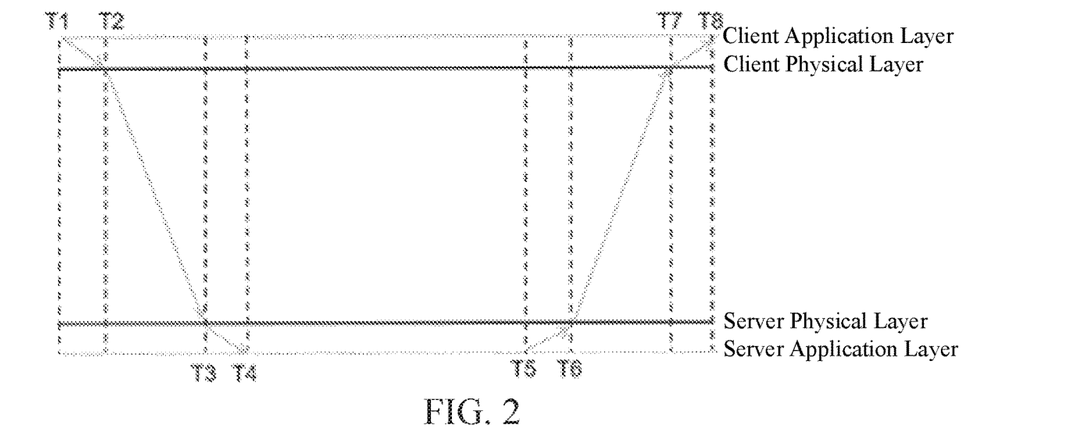
FIG. 2 is a schematic diagram of a process of transmitting a data packet between a client and a server according to an embodiment of the present disclosure.

Below the time service precision control method provided in this application will be described in connection with specific examples. FIG. 2 is a schematic diagram of a process of transmitting a data packet between a client and a server according to another embodiment of the present disclosure.

On the basis of the NTPV0 protocol, the client-server mode of this protocol is adopted, and the communication mode is UDP. On the basis of this protocol, the time service source is the server, and the client is the seismic collector (hereinafter referred to as the client), which is the timed unit. In the server side, it is assumed by default that the server has a precise time service at this time. The time source can come from GPS or other time service units, which will not be discussed here, but some of the algorithm restrictions in the server's time service process require application layer software restrictions, which are specifically mentioned here.

In addition, other conventional names and general synchronization processes in the NTP protocol are involved, and will not be repeated in the present disclosure.

In order to achieve the above-mentioned features of the disclosure, the technical solutions of the disclosure are described as follows.

As illustrated in FIG. 2, the meanings of the reference signs are as follows: T1: The time when the client application layer sends the data packet after packing in the synchronization phase; T2: The time when the client physical layer sends the data packet after packing in the synchronization phase; T3: The time when the server's physical layer receives the data packet in the synchronization phase; T4: The time when the server's application layer receives the data packet in the synchronization phase; T5: The time when the server's application layer sends the data packet after packing during the synchronization phase; T6: The time when the server's physical layer sends the data packet after packing during the synchronization phase; T7: The time when the client physical layer receives the data packet in the synchronization phase; T8: The time when the client application layer receives the data packet in the synchronization phase.

Further, in terms of the above-mentioned reference signs, for the sake of convenience of explaining the following algorithm, and the derived reference signs include: D1: The time interval experienced by the client from the packaging at the application layer to the packaging at the physical layer packaging during the synchronization phase; D2: The network link delay of the data packet from the client to the server in the synchronization phase; D3: The time interval between the receiving at the physical layer to the receiving at the application layer of the server in the synchronization phase; D4: The time interval from receiving the data packet to sending the data packet at the server application layer in the synchronization phase; D5: The time interval that the server undergoes from the application layer packaging to the physical layer during the synchronization phase; D6: The network link delay between the data packet from the server to the client in the synchronization phase; D7: The time interval for the client receiving at the physical layer to receiving at application layer in the synchronization phase.

Furthermore, since the working mechanism of NTP is based on UDP and is based on the network application layer, its timing error mainly comes from two aspects. One is that for different operating systems, the data of the data packets from the physical layer to the application layer is uncontrollable and cannot be estimated; the other is that during the synchronization process, the network delay from the client to the server and from the server to the client is uncontrollable. It also changes depending on different network environments. Therefore, this algorithm is optimized for the above-mentioned two major ways of generating errors in NTP, in order to improve the time service precision.

Further, for the timing errors of data packets from the physical layer to the network layer and data packets from the network layer to the physical layer, a hardware interrupt-based delay control algorithm between the application layer and the physical layer is proposed, which can be expressed as follows, in terms of the client: 1. Set the data packet transmission at the physical layer to interrupt mode, cancel the round-robin mode, and set the sending priority to the highest, so as to ensure that this task is not interrupted by other tasks at the time of sending; 2. Pack the NTP data packet at time point T1 and fill in the necessary fields. The sending time field is filled with the client's own time CT1 obtained at the time of packing plus 1 ms, and the internal timer CTIMER1 is started for interrupt. The interrupt priority is set to physical layer priority minus 1 (that is, second only to the physical layer transmission priority), and the TIMER interrupt time is set to 1 ms; 3. Wait for the CTIMER1 interrupt. When the interruption occurs, that is, when the physical layer data packet is interrupted at T2, the data packet is sent out; 4. Set the reception at the physical layer to interrupt mode, and the interrupt priority is the highest. Since the physical layer transmission and reception cannot occur at the same time, there will be no conflict between the two; 5. When the data packet arrives, the physical layer reception interrupt is automatically triggered. At this time, the client's own time obtained at this moment is stored in the memory variable, and the client data packet processing flag is set at the same time, in order to wait for processing; 6. The application layer polling execution sequence sets the NTP data receiving and processing flag bit as the front end, which can ensure that its polling queue can process its data packets in the first Further, because the stamping of both client's data packet sending and receiving timestamps is based on interrupts, and the priority is set to the highest, so when the main frequency is set to 10M or above, the time precision after execution can be controlled within 1 microsecond.

Further, for the server side, the specific execution algorithm can be expressed as follows: 1. Set the reception at the physical layer to interrupt mode, and its interrupt priority is the highest. After that, the server can automatically trigger after receiving the physical layer data packet; 2. After the physical layer receives the data packet, the server interruption is triggered. At this time, the time stamp of the server is stamped, and the time point of the receiving time is stored in the memory variable SVAR1; 3. Delay, the delay interval is set to 2 ms; 4. Prepare to send the data packet. At this time, fill the variable SVAR1 into the data packet to be sent, and get the current time, fill the obtained current time into SAVAR2, and add 1 ms to the time in SAVR2, which is then reassigned to SAVR2; 5. Start the internal timer STIMER1, set the timer's interrupt priority to the highest, and set the time interval to 1 ms, and set the transmission interrupt at the physical layer to the highest priority; 6. Wait for the STIMER1 interrupt. When the interrupt occurs, start the physical layer data packet transmission interrupt, and the data packet is sent.

Furthermore, using the above-mentioned client and server sending and receiving algorithms, the data packet timestamp can be accurately stamped at this time, and because this algorithm adopts a symmetric algorithm mode on both the client and the server, the execution error caused by it can be greatly reduced due to the symmetry.

Further, in view of the error caused by the network delay, the following network delay optimal solution estimation algorithm can be adopted to greatly reduce the error caused by the network delay. First, the network delay optimal solution estimation algorithm is expressed as follows. The variables involved in the expression process include: 1. GAP: the clock offset between the client and the server; 2. DELAY: The round-trip time delay from the client to the server and the server to the client. At this time, the two variables can be calculated by extracting the relevant fields from the NTP data packet, and so the calculation method is a normal operation, which will not be detailed herein; 3. NETCONSUM: this is the network environment constraint value, this value can be set by the user. When the network environment is not satisfactory, this value can be increased to achieve quality constraints; 4. STRVAR: Convergence coefficient, this coefficient controls the convergence range of time service, and the default setting is 2. The higher the coefficient is selected, the higher the constrained convergence effect will be, and abnormal values can be controlled to be excluded; 5. LIBSUM: The maximum number of samples in the fitting library. This value controls the maximum number of samples in the convergence library. Old samples larger in excess of this number will be discarded, and this value is usually set to 64; 6. FILSUM, the number of filter samples, the number of samples using the Kalman filter, and the number of samples smoothed and filtered by the Kalman filter, usually 32, which can be selected according to needs.

Now the optimal solution estimation algorithm of this network delay is expressed as follows: 1. Set NETCONSUM as a fixed constant. In general network environment, set this value to 16. If network environment deterioration is encountered, this value can be increased; 2. GAP and DELAY values during NETCONSUM secondary time synchronization can be counted and measured; 3. For the first cycle, select the minimum value of DELAY in NETCONSUM as DELAY0, and put DELAY0 and its corresponding GAP0 into the sample library, mark this value as available, and use this value for subsequent time correction calculations; 4. Continue to count and measure the GAP and DELAY values in the NETCONSUM secondary time synchronization process, and select the minimum value in NETCONSUM as DELAY1 and GAP1; 5. Perform constraint convergence judgment on DELAY1 and GAP1. If DELAY1 is less than DELAY0 and GAP1 lies within the range of GAP0±(DELAY1−DELAY0)/STRVAR, then update DELAY1 and GAP1 to the new GAP0 and DELAY0, mark this value as available, and this value can be used for subsequent time correction calculations, and when the effective samples are larger than LIBSUM, the queue method is used to replace the oldest sample value with the latest sample. If GAP1 is not within this range, this value is discarded; 6. Calculate the number FILCNT of effective samples of Kalman filter. If the number of effective samples is greater than FILSUM, perform Kalman filter on the GAP and DELAY values in the included samples, and then get the optimal DELAYD and GAPD, which can be applied to the final time correction. At this time, clear FILCNT, and then return to state 4 to continue execution. If FILCNT is less than FILSUM, then increment FILCNT and return to state 4 for execution.

The present disclosure provides a high-precision network timing algorithm based on a real-time data transmission seismic collector. This algorithm can be applied to a data collector equipped with network transmission hardware, and can realize time service through software algorithms without changing the hardware where the time service precision can be greatly improved. In order to achieve maximum compatibility, the algorithm can run on the NTPV0 version. Therefore, the implementation basis of this algorithm does not involve the subsequent advanced versions of the NTP protocol. Since the advanced versions of NTP are backward compatible, the application of this algorithm will not be affected when the user uses the advanced versions of the NTP protocol.

Embodiment 3

Figure 3:
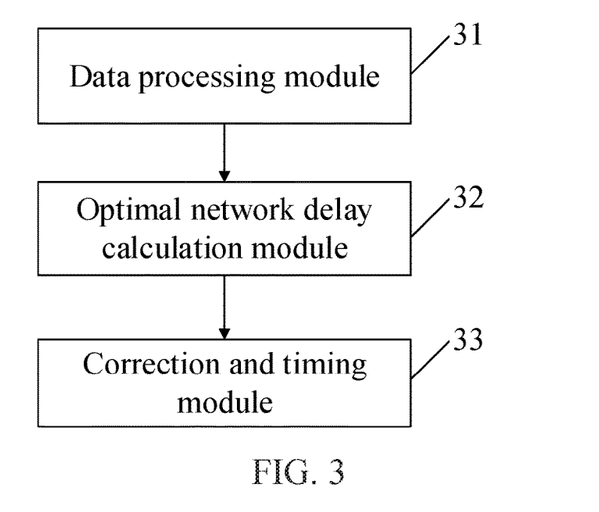
FIG. 3 is a block diagram of a network timing precision control system of a seismic collector provided by an embodiment of the present disclosure.

FIG. 3 illustrates a method for controlling network timing precision of a seismic collector according to another embodiment of the present disclosure, which is described in detail as follows.

Regarding this high-precision network timing algorithm based on a real-time data transmission seismic collector, the client and server it depends on in this embodiment are Cortex-M3 embedded MCUs based on the ARM architecture, and the selected model is STMicroelectronics's STM32F2 series. Here, this algorithm does not need to make specific requirements for the MCU model, only that the MCU has a corresponding network physical layer interrupt register, which can be configured and respond to this register interrupt. For the operating system used by the client and server, there is also no mandatory dependency requirement in the sub-algorithm, but the following two conditions are required in this operating system: 1. There is a network physical layer interrupt hook function or interface, which can perform corresponding operations when an interrupt occurs; 2. Specific priority configuration can be made for the corresponding interrupt sequence. When different interrupts occur at the same time, different interrupt functions can be responded to according to different priorities. In this example, the existing operating system is not used, and only the embedded software system design based on interrupt driver and state machine is adopted. The hardware interrupt can interrupt the execution of the main state machine by its priority, and the main state machine can realize the execution order of the execution sequence by setting different state flag bits.

Furthermore, for the timing errors of data packets from the physical layer to the network layer and data packets from the network layer to the physical layer, a hardware interrupt-based delay control algorithm between the application layer and the physical layer is proposed, where in terms of the client specifically, this client MCU chip uses the STM32F207 chip, which has a 10/100 Ethernet MAC as the physical layer and provides a hardware interrupt vector, which may be specifically expressed as follows: 1. Set the physical layer data packet transmission to interrupt mode, cancel the round-robin mode, and set the sending priority to the highest, so as to ensure that the task is not interrupted by other tasks at the time of sending. In this example, set the master priority of the physical layer transmission to interrupt 0, the slave priority is 0, that is, the highest priority in this chip; 2. Pack the NTP data packet at time point T1 and fill in the necessary fields, where the packaging of the NTP data packet includes the NTP server address filling, UDP necessary data packet filling, and the sending time field is filled with the client's own time CT1 obtained at the time of packing plus 1 ms. Start the internal timer CTIMER1 for interrupt, the priority of the interrupt is set to the physical layer priority minus 1 (that is, second only to the physical layer transmission priority), and the CTIMER interrupt time is set to 1 ms, here because its transmission time field has been added with 1 ms during filling, and the CTIMER interrupt can be used to achieve precise control of 1 ms delay, so the 1 ms time delay can be accurately offset at the time of CTIMER1 sending; 3. Wait for the CTIMER1 interrupt. When the interrupt occurs, that is, when the physical layer data packet is interrupted at time point T2, the data packet is sent. Here, the physical layer data transmission is executed in the CTIMER1 interrupt, because it is of the same priority, its sending process will not be interrupted; 4. Set the reception at physical layer to interrupt mode, and the interrupt priority is the highest. Here, set the receiving master priority to 0 and the slave priority to 0. Since the physical layer transmission and reception cannot occur at the same time, the two don't conflict; 5. When the data packet arrives, the physical layer reception interrupt is automatically triggered. At this time, the client's own time obtained at this moment is stored in the memory variable. In this example, the variables mainly include the four time variables in the data packet. At the same time, set the client data packet processing flag bit and wait for processing; 6. The application layer polling execution sequence sets the NTP data reception processing flag as the front end, which can ensure that its polling queue can process its data packets in the first time. In this example, the polling flag is mainly used to set its polling processing priority level. Setting its polling processing level to the highest level can ensure that it gets the first processing in the subsequent polling process.

Further, because the stamping of both client's data packet sending and receiving timestamps is based on interrupts, and the priority is set to the highest, so when the main frequency is set to 10M or above, the time precision after execution can be controlled within 1 microsecond. In this example, the client crystal oscillator uses a 12M crystal oscillator, and its main clock frequency is 48M after passing through the frequency multiplier.

Furthermore, for the server side, in this example, STM32F207 is also used as the main chip. The peripheral network hardware is the same as that of the client. It also has 10/100 Ethernet MAC as the physical layer and provides hardware interrupt vectors. Because it requires more concurrent operations, the main frequency after the frequency multiplier is set to 120M, the specific execution algorithm can be expressed as follows: 1. Set the reception at the physical layer to the interrupt mode, and the interrupt priority is the highest. In this example, set the interrupt master priority to 0, and the slave priority to 0, which is the highest priority. Then, the server can automatically trigger after receiving the physical layer data packet; 2. After receiving the data packet, the physical layer triggers the server interruption. At this time, the time stamp of the server is added, and the time of the receiving time is stored in the memory variable SVAR1. This time the time stamp is the server receiving time, which is convenient for subsequent filling in the data packet field returned to the client; 3. Delay. The delay interval is set to 2 ms. In this example, it is set to 2 ms. Because this delay interval is not a precision requirement, and its precision will not affect the precision of the entire clock synchronization process, the common delay algorithm will be used, which therefore will not be detailed herein; 4. Prepare to send the data packet. At this time, fill the variable SVAR1 into the data packet to be sent, and get the current time, fill the obtained current time into SAVAR2, and add 1 ms to the time in SAVR2, which is then reassigned to SAVR2; 5. Start the internal timer STIMER1, set the timer's interrupt priority to the highest, and set the time interval to 1 ms, and set the physical layer transmission interrupts to the highest priority, here set STIMER1 and the physical layer transmission interrupts as the master priority, which is 0, and the slave priority is 0; 6. Wait for the STIMER1 interrupt. When the interrupt occurs, the physical layer data packet transmission interrupt is started, and the data packet is sent.

Furthermore, using the above-mentioned client and server sending and receiving algorithms, the data packet timestamp can be accurately stamped at this time, and because this algorithm adopts a symmetric algorithm mode on both the client and the server, the execution error caused by it can be greatly reduced due to the symmetry.

Further, in view of the error caused by the network delay, the following network delay optimal solution estimation algorithm can be adopted to greatly reduce the error caused by the network delay. First, the network delay optimal solution estimation algorithm is expressed as follows. The variables involved in the expression process have been introduced in the previous section of this specification, which therefore will not be repeated here again.

Now the optimal solution estimation algorithm of this network delay is expressed as follows: 1. Set NETCONSUM as a fixed constant. In general network environment, set this value to 16. If network environment deterioration is encountered, this value can be increased, which is set to 16 in this example; 2. GAP and DELAY values during NETCONSUM secondary time synchronization are counted and measured. In this example, this variable is used as a two-dimensional array of NETCONSUM and stored as a statistical variable; 3. For the first cycle, select the minimum value of DELAY in NETCONSUM as DELAY0, and put DELAY0 and its corresponding GAP0 into the sample library, mark this value as available, and use this value for subsequent time correction calculations. In this example, the minimum value in the above array is obtained by comparison and stored in DEALY0; 4. Continue to count and measure the GAP and DELAY values in the NETCONSUM secondary time synchronization process, and select the minimum value in NETCONSUM as DELAY1 and GAP1. In this example, the time interval for continual statistics and measurement is 10 seconds. This interval is set by the user and can be set according to the clock frequency. The smaller the set value, the faster the clock frequency; 5. Perform constraint convergence judgment on DELAY1 and GAP1. If DELAY1 is less than DELAY0 and GAP1 lies within the range of GAP0±(DELAY1−DELAY0)/STRVAR, then update DELAY1 and GAP1 to the new GAP0 and DELAY0, mark this value as available, and this value can be used for subsequent time correction calculations. In this example, because the relationship between the magnitudes of DELAY1 and DELAY0 is uncertain, the value generated after ±(DELAY1−DELAY0) is the range value, which needs to be paid attention to by the user, and when the effective sample is larger than LIBSUM, the queuing method is used to replace the oldest sample value with the latest sample. In this example, a first-in-last-out circular queue structure is used, so the oldest variable value can be replaced by the latest value, and if GAP1 is not in this range, this value will be discarded and this calculation will not be affected; 6. Calculate the number FILCNT of effective samples of Kalman filter. If the number of effective samples is greater than FILSUM, perform Kalman filter on the GAP and DELAY values in the included samples, and then get the optimal DELAYD and GAPD, which can be applied to the final time correction. At this time, clear FILCNT, and then return to state 4 to continue execution. In this example, the DELAYD and GAPD are credible and usable variable values. The user can use this variable to perform clock correction. At this time, clear FILCNT and return to state 4 to continue execution. If FILCNT is less than FILSUM, then increment FILCNT and return to state 4 for execution. At this time, the new Kalman filter coefficient buffer is not satisfied, so no new credible and usable DELAYD and GAPD are generated.

Embodiment 4

FIG. 3 is a block diagram of a network timing precision control system of a seismic collector provided by an embodiment of the present disclosure. For ease of description, only the parts related to the embodiments of the present disclosure are illustrated.

The system for controlling Network timing precision of a seismic collector may include:

a data processing module 31 that is configured for using an interrupt mode to make the data packet be received by an application layer of the client upon receiving a data packet by the client 31, and using the interrupt mode to send the data packet from the application layer of the client to a physical layer of the client;

an optimal network delay calculation module 32 that is configured for: continually detecting GAP value and DELAY value at different times during a secondary time synchronization process with the network environment constraint value, where the GAP value is the clock offset between the client and the server, and the DELAY value represents the time delay of the data packet in the round-trip process between the client and the server; performing constrained convergence judgment on the GAP value and DELAY value, and calculating the optimal network delay; and a correction and timing module 33 that is configured for correcting the transmission error in the network timing process according to the optimal network delay, so that the physical layer of the server receives the data packet, and the data is sent from the physical layer of the server to the application layer of the server using the interrupt mode for timing the data packet.

Embodiment 5

Figure 4:
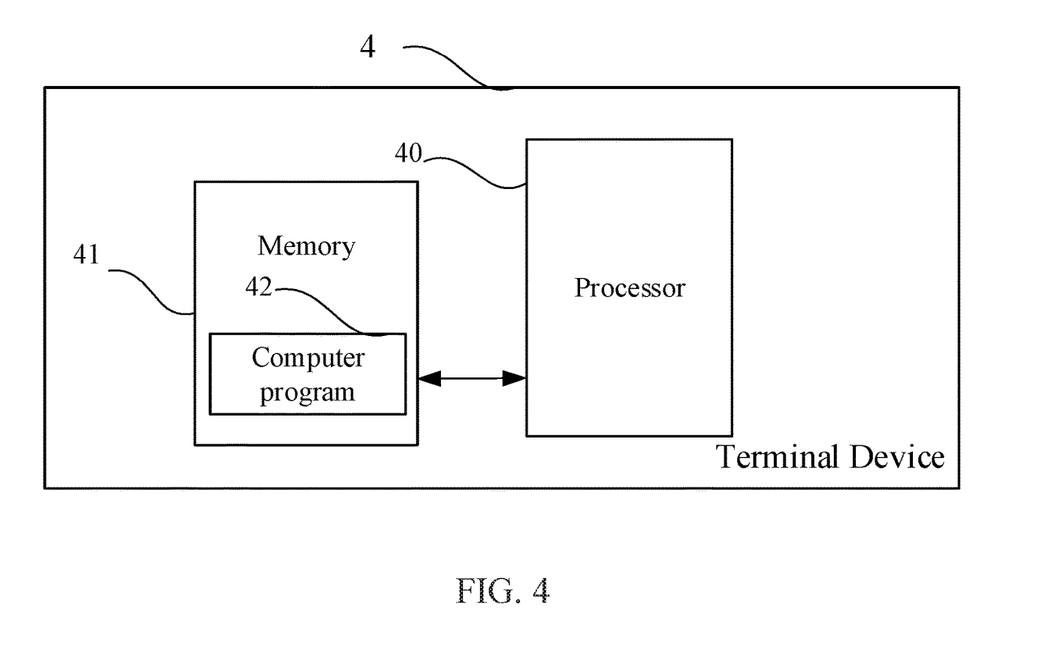
FIG. 4 is a block diagram of a terminal device provided by an embodiment of the present disclosure.

FIG. 4 is a block diagram of a terminal device provided by Embodiment 4 of the present disclosure. As illustrated in FIG. 4, the terminal device 4 of this embodiment includes a processor 40, a memory 41, and a computer program 42 stored in the memory 41 and that is operative to run on the processor 40. The processor 40 performs the operations of the method described in the first embodiment, for example, operations S101 to S106 illustrated in FIG. 1, when the computer program 42 is executed. When the processor 40 executes the computer program 42, the functions of the modules/units in the foregoing device embodiments, such as the functions of the modules 31 to 33 illustrated in FIG. 3, are realized.

Exemplarily, the computer program 42 may be divided into one or more modules/units, and the one or more modules/units are stored in the memory 41 and executed by the processor 40 to practice the present disclosure. The one or more modules/units may be a series of computer program instruction segments capable of accomplishing specific functions, and the instruction segments are used to describe the execution process of the computer program 42 in the terminal device 4.

The above description of the disclosed embodiments enables those having ordinary skill in the art to implement or use the present disclosure. Various modifications to these embodiments will be obvious to those having ordinary skill in the art, and the general principles defined in the present disclosure may be implemented in other embodiments without departing from the spirit or scope of the present disclosure. Therefore, the present disclosure will not be limited to the embodiments disclosed herein, but should conform to the widest scope consistent with the principles and novel features disclosed in the present disclosure.

What is claimed is:

1. A method for controlling network timing precision of a seismic collector, comprising:

upon receiving a data packet by a client, using, by the client, an interrupt mode to make the data packet to be received by an application layer of the client, and using the interrupt mode to send the data packet from the application layer of the client to a physical layer of the client;

presetting, by the client, a network environment constraint value when sending the data packet to a server;

continually detecting a GAP value and a DELAY value at different time points during a time synchronization process with the network environment constraint value, wherein the GAP value is a clock offset between the client and the server, and the DELAY value represents a time delay of the data packet in a round-trip between the client and the server;

calculating an optimal network delay according to the GAP value and the DELAY value;

correcting a transmission error in a network timing process according to the optimal network delay, and receiving the data packet by a physical layer of the server; and sending the data packet from the physical layer of the server to an application layer of the server using the interrupt mode thereby timing the data packet.

2. The method of claim 1, wherein the operation of upon receiving a data packet by a client, using, by the client, an interrupt mode to make the data packet to be received by an application layer of the client and using the interrupt mode to send the data packet from the application layer of the client to a physical layer of the client comprises:

presetting a data packet sending mode of the application layer of the client and a data packet receiving mode of the physical layer of the client to the interrupt mode, setting a priority of the physical layer of the client to the highest, and setting a priority of interruption of the application layer of the client to be equal to the priority of the physical layer of the client minus 1;

at time point T1, packing, by the client, the data packet, and filling a sending time field with the client's own time CT1 obtained at the time of packing plus 1 millisecond, and sending the data packet from the application layer when an interrupt occurs; and upon detecting the arrival of the data packet at the physical layer of the client, interrupting the reception by the physical layer of the client, and storing the client's own time obtained at this time, and marking a flag bit of the data packet and waiting for processing.

3. The method of claim 1, wherein the operation of calculating an optimal network delay according to the GAP value and the DELAY value comprises:

selecting a minimum value of DELAY in the network environment constraint value as DELAY0 in a first cycle, and storing the DELAY0 and its corresponding GAP0 in a sample library as samples;

continuing to count and measure the GAP value and DELAY value in the time synchronization process with the network environment constraint value, and selecting a minimum value of the network environment constraint value as DELAY1 and GAP1;

if DELAY1 is less than DELAY0 and GAP1 lies within the range of GAP0±(DELAY1−DELAY0)/convergence coefficient, updating the DELAY1 and GAP1 as new GAP0 and DELAY0, marking this value as available and the samples as valid samples;

if the number of valid samples is greater than a maximum number of samples in a fitting library, performing Kalman filtering on the GAP and DELAY values in the valid samples to obtain DELAYD and GAPD values of an optimal solution; and using the DELAYD value and GAPD value of the obtained optimal solution as the optimal network delay.

4. The method of claim 3, further comprising:

if DELAY1 is not less than DELAY0 or GAP1 does not lie within the range of GAP0±(DELAY1−DELAY0)/convergence coefficient, then discarding the DELAY value and GAP value counted in this time.

5. The method of claim 4, wherein the maximum number of samples in the fitting library is 64.

6. The method of claim 1, wherein the client and server are Cortex-M3 embedded microcontroller units (MCUs) based on Advanced RISC Machine (ARM) architecture.

7. The method of claim 6, wherein a selected model of the MCUs is STM32F2 series from STMicroelectronics.

8. The method of claim 6, wherein a client MCU chip uses STM32F207 chip, which comprises a 10/100 Ethernet Media Access Control (MAC) as the physical layer and provides a hardware interrupt vector.

9. The method of claim 6, wherein a server MCU chip uses STM32F207 chip, which comprises a 10/100 Ethernet Media Access Control (MAC) as the physical layer and provides a hardware interrupt vector.

10. The method of claim 1, wherein a client crystal oscillator uses a 12 million hertz (12M) crystal oscillator, and its main clock frequency is 48 million hertz (48M) after passing through a frequency multiplier.

11. A terminal device, comprising a memory, a processor, and a computer program stored in the memory and operative to be running on the processor, wherein the processor executes the operations of the method of claim 1 when executing the computer program.

12. A non-transitory computer-readable storage medium storing a computer program, which when executed by a processor causes the operations of the method of claim 1 to be performed.

13. A system for controlling network timing precision of a seismic collector, comprising:

a data processing module, configured for, upon receiving a data packet by a client, using an interrupt mode to make the data packet to be received by an application layer of the client, and using the interrupt mode to send the data packet from the application layer of the client to a physical layer of the client;

an optimal network delay calculation module, configured for: continually detecting a GAP value and a DELAY value at different time points during a time synchronization process with a preset network environment constraint value, wherein the GAP value is a clock offset between the client and the server, and the DELAY value represents a time delay of the data packet in a round-trip between the client and the server; and calculating an optimal network delay according to the GAP value and the DELAY value;

a correction and timing module, configured for correcting a transmission error in a network timing process according to the optimal network delay, so that the physical layer of the server receives the data packet and sends the data packet to an application layer of the server using the interrupt mode thereby timing the data packet.

14. The system of claim 13, wherein the data processing module is configured for:

presetting a data packet sending mode of the application layer of the client and a data packet receiving mode of the physical layer of the client to the interrupt mode, setting a priority of the physical layer of the client to the highest, and setting a priority of interruption of the application layer of the client to be equal to the priority of the physical layer of the client minus 1;

at time point T1, packing, by the client, the data packet, and filling a sending time field with the client's own time CT1 obtained at the time of packing plus 1 millisecond, and sending the data packet from the application layer when an interrupt occurs; and upon detecting the arrival of the data packet at the physical layer of the client, interrupting the reception by the physical layer of the client, storing the client's own time obtained at this time, and marking a flag bit of the data packet and waiting for processing.

15. The system of claim 13, wherein the operation of the optimal network delay calculation module calculating an optimal network delay according to the GAP value and the DELAY value comprises:

selecting a minimum value of DELAY in the network environment constraint value as DELAY0 in a first cycle, and storing the DELAY0 and its corresponding GAP0 in a sample library as samples;

continuing to count and measure the GAP value and DELAY value in the time synchronization process with the network environment constraint value, and selecting a minimum value of the network environment constraint value as DELAY1 and GAP1;

if DELAY1 is less than DELAY0 and GAP1 lies within the range of GAP0±(DELAY1−DELAY0)/convergence coefficient, updating the DELAY1 and GAP1 as new GAP0 and DELAY0, marking this value as available and the samples as valid samples;

if the number of valid samples is greater than a maximum number of samples in a fitting library, performing Kalman filtering on the GAP and DELAY values in the valid samples to obtain DELAYD and GAPD values of an optimal solution; and using the DELAYD value and GAPD value of the obtained optimal solution as the optimal network delay.

16. The system of claim 13, wherein the client and server are Cortex-M3 embedded microcontroller units (MCUs) based on Advanced RISC Machine (ARM) architecture.

17. The system of claim 16, wherein a selected model of the MCUs is STM32F2 series from STMicroelectronics.

18. The system of claim 16, wherein a client MCU chipusesSTM32F207 chip, which comprises a 10/100 Ethernet Media Access Control (MAC) as the physical layer and provides a hardware interrupt vector.

19. The system of claim 16, wherein a server MCU chipusesSTM32F207 chip, which comprises a 10/100 Ethernet Media Access Control (MAC) as the physical layer and provides a hardware interrupt vector.

20. The system of claim 13, wherein a client crystal oscillator uses a 12 million hertz (12M) crystal oscillator, and its main clock frequency is 48 million hertz (48M) after passing through a frequency multiplier.

* * * * *